3,849,498
METHOD OF PREVENTING THE POLYMERIZATION OF UNSATURATED ALDEHYDE
Ryozi Sato, Takaoka, and Yasuyoshi Chino, Tokyo, Japan, assignors to Nippon Zeon Co., Ltd., Tokyo, Japan
No Drawing. Filed Dec. 22, 1971, Ser. No. 211,106
Claims priority, application Japan, Dec. 26, 1970, 45/119,037
Int. Cl. C07c 47/20, 47/22
U.S. Cl. 260—601 R  6 Claims

ABSTRACT OF THE DISCLOSURE

A method of preventing the polymerization of unsaturated aldehydes in alcohol solution, which comprises adding to the solution, as a polymerization inhibitor, a hydroxylamine of the formula:

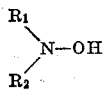

(wherein $R_1$ is selected from the group consisting of hydrogen, acyclic and cyclic hydrocarbon groups having 1–8 carbon atoms and $R_2$ is selected from the group consisting of acyclic and cyclic hydrocarbon groups having 1–8 carbon atoms), in an amount sufficient to inhibit polymerization. An unsaturated aldehyde/alcohol solution thus stabilized.

BACKGROUND OF THE INVENTION

Field of the Invention

This invention relates to a method of stabilizing unsaturated aldehydes, i.e. to a method of preventing the polymerization of unsaturated aldehydes.

Description of the Prior Art

While unsaturated aldehydes such as acrolein or methacrolein are compounds which are valuable as starting materials in the chemical industry, they are extremely unstable compounds which are liable to polymerize with ease.

For example, such unsaturated aldehydes are usually present in an alcohol solution, and are exposed to elevated temperatures, e.g. above 60° C., and particularly 80–150° C. or higher in the reaction, absorption, recovery, separation and purification operations in, for example, such processes as follows:

(i) A process for separating unsaturated aldehydes (acrolein or methacrolein) from a gaseous mixture containing said unsaturated aldehyde obtained by the vapor phase oxidation of an olefin (propylene or isobutylene), which comprises absorbing the unsaturated aldehyde in a gaseous mixture with an alcohol solvent, and extracting the organic solvent from the resulting solution by using water to thereby separate the unsaturated aldehyde as an extraction residue phase and thereafter recovering and separating the unsaturated aldehyde from the residue.

(ii) A process for production of an unsaturated acid ester by reacting an unsaturated aldehyde with hydrogen peroxide in alcohol solution in the presence of a selenium oxide catalyst.

In such processes the polymer separates out in the system to either become adhered to the walls of the reactor or clog the lines, etc., and hence becomes the cause of serious trouble in carrying out the operation. A loss of the unsaturated aldehyde monomer also, of course, results (unsaturated aldehyde monomer is often referred to merely as monomer). These are distinct commercial and economic disadvantages.

As inhibitors for preventing the polymerization of unsaturated aldehydes numerous compounds are generally used such as hydroquinone, metal compounds, thiocarbamic acid, etc. However, practically all of these compounds do not show any stabilizing effect, when the monomer is present in alcohol solution at elevated temperatures. Further, even in those cases where no separation of polymer is seen, it is observed that a decrease takes place in the amount of monomer. This loss of monomer is substantiated by analysis such as by gas chromatography. It is conceivable that the monomer loss is due to decomposition of the monomer, dimerization of the monomer resulting from conjugate double bonds, the formation of a low polymer of an order that will not separate out, etc.

SUMMARY OF THE INVENTION

One object of the present invention is to provide a method of effectively stabilizing unsaturated aldehydes, especially a method of preventing the polymerization and less of monomer in alcohol solution at elevated temperatures, by the discovery of an inhibitor which does not possess the hereinbefore noted short comings.

Other objects and advantages of the invention will become apparent from the following description.

As a result of our research with a view to achieving the foregoing objects, we found that an alkylhydroxylamine was most useful as an inhibitor for unsaturated aldehydes.

Thus these objects of the present invention can be achieved by adding an effective amount of a hydroxylamine of the formula:

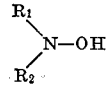

(wherein $R_1$ is selected from the group consisting of hydrogen, acyclic and cyclic hydrocarbon groups having 1–8 carbon atoms and $R_2$ is selected from the group consisting of acyclic and cyclic hydrocarbon groups having 1–8 carbon atoms), to the unsaturated aldehyde in alcohol solution. When $R_1$ is not hydrogen, $R_1$ and $R_2$ may be of the same or different group.

DETAILED DESCRIPTION OF THE INVENTION

Examples of said hydroxylamine compounds used in the present invention include N-alkylhydroxylamines such as N-methylhydroxylamine, N-ethylhydroxylamine, N-propylhydroxylamine and N-butylhydroxylamine, N,N-dihexylhydroxylamine, N,N-dialkylhydroxylamines such as N,N-dimethylhydroxylamine, N,N-diethylhydroxylamine, N,N-di-n-propylhydroxylamine, N,N-diisopropylhydroxylamine, N,N-dibutylhydroxylamine, N,N-diamylhydroxylamine, N,N-dioctylhydroxylamine, N-methyl-N-ethylhydroxylamine, N-methyl-N-butylhydroxylamine, N-methyl-N-hexylhydroxylamine, N,N-diarylhydroxylamines such as N,N-diphenylhydroxylamine, N,N-dicycloalkylhydroxylamine such as N,N-dicyclohexylhydroxylamine and the like. Further, these hydroxylamines can be used in the form of their hydrate or salt wherein said salt is derived from an organic acid such as hydrochloric, sulfuric acid or nitric acid, an organic acid such as oxalic acid, malonic acid, citric acid, or an aliphatic acid containing 1–18 carbon atoms, especially 1–4 carbon atoms, such as formic acid, acetic acid, propionic acid, butyric acid, stearic acid and the like. Accordingly, these alkylhydroxylamine hydrates or salts are also included as inhibitors in accordance with the present invention.

The preferred hydroxylamine is a N,N-dialkylhydroxylamine having 1–6 carbon atoms, especially 1–4 carbon atoms, in each alkyl group.

As unsaturated aldehydes, acrolein or methacrolein are included in accordance with the invention.

Examples of alcohols to be used in the invention include aliphatic alcohols having a 1–8 carbon atoms, specifically alkanols such as methylalcohol, propylalcohol, butylalcohol, isobutyl alcohol, hexylalcohol, n-octylalcohol or 2-ethylhexylalcohol. Further, while generally, the effect of this invention can be fully achieved regardless of the weight ratio of the monomer to the alcohol, the preferred weight ratio of the monomer to the alcohol is 0.03–30:1.

That the inhibitor of the present invention shows a unique function or effect is substantiated by the fact that despite the marked stabilizing effect it has on the monomer in the alcohol solution, it has practically no effect on the stabilization of monomer in the absence of solvent, that it has practically no effect on the stabilization of monomer in solvents other than alcohols, and that while the numerous conventional inhibitors show practically no stabilizing effect, the inhibitors of the invention not only have an apparent stabilization effect but also have the effect of significantly preventing the loss of monomer.

The inhibitors of the invention exhibit over a prolonged period of time a remarkable stabilizing effect unlike conventional inhibitors even when monomer is exposed to elevated temperatures, especially when monomer is present in alcohol solution, not to mention the cases of being exposed to low temperature such as during storage of the monomer. And, open test effect of this invention can be achieved at elevated temperature, e.g. 100° C. In addition, this effect is not diminished even where the monomer is contacted with stainless steel or ordinary carbon steel. Again, even when water, or by-products (obtained by the vapor phase oxidation of olefins to unsaturated aldehydes) such as organic acids, e.g. acetic acid, acrylic acid, methacrylic acid, ketones such as acetone, are present in the alcohol solution containing the monomer, the stabilizing effect of the inhibitors of the invention is not diminished.

While the amount of the inhibitor to be added is capable of being widely varied depending upon the environment of the monomer, e.g., temperature conditions, amount of monomer in alcohol solution, the type of alcohol solution, the type of alcohol, or other conditions, it is at least 0.001% by weight, and usually 0.001 to 3% by weight, and preferably 0.01 to 1% by weight, based on the monomer. The amount added may, of course, be increased, if desired. When the added amount is less than 0.001% by weight, the effect of this invention cannot be achived. On the other hand, when added amount is more than 3% by weight, there is no disadvantage on the effect of stabilization, regardless of expense. Again, in practicing the method of the invention, the known inhibitors of unsaturated monomers may be suitably used conjointly in standard, i.e., inhibiting amounts.

The following non-limitative examples are given to more specifically illustrate the present invention.

EXAMPLES AND CONTROLS

The various inhibitors shown in Tables I and II were added to sample solutions containing the monomer (methacrolein or acrolein weight percent shown) shown in Tables I and II, after which the mixtures were charged into an ordinary steel container. The mixtures were then heated to a temperature of 100° C. and held at this tempearture for 5 hours, at the end of which period the state of polymer separation was observed to determine if insoluble polymer was formed (state of solution). When there was no separation of polymer, the solution was added dropwise to n-hexane, and the presence or absence of polymer was confirmed by whether or not a precipitate was formed (condition of dropping into n-hexane). Further, the monomer content of the solution before its heating and after its heating was determined by gas chromatography, and the decrease in monomer content was obtained by a comparison of the two measurements (monomer decrease). The amount of inhibitor added is shown by weight percent based on the monomer. Further, the dash (—) mark in the table indicates where a measurement was not made, since the sample was solidified by heating, and measurement was deemed unnecessary.

The results obtained are shown in the following table.

TABLE I

| Ex. | Inhibitor | Weight percent based on the monomer | Sample solution (composition, weight percent based on total composition) | | | | State of solution | Condition of dropping into n-hexane | Monomer increase |
|---|---|---|---|---|---|---|---|---|---|
| | | | Monomer | Percent | Alcohol | Water, Percent percent | | | |
| 1 | N,N-diethylhydroxylamine | 0.1 | Methacrolein | 80 | Methyl | 20   0 | Colorless and transparent | No precipitation | 0.9 |
| 2 | do | 0.1 | do | 80 | do | 15   5 | do | do | 5.6 |
| 3 | do | 0.1 | do | 50 | do | 40   10 | do | do | 9.2 |
| 4 | do | 0.1 | do | 50 | do | 50   0 | do | do | 2.5 |
| 5 | do | 0.1 | do | 20 | do | 70   10 | do | do | 5.8 |
| 6 | do | 0.1 | do | 20 | do | 80   0 | do | do | 0.5 |
| 7 | do | 0.1 | do | 95 | do | 3   2 | do | do | 3.5 |
| 8 | do | 0.1 | do | 95 | n-Butyl | 3   2 | do | do | 3.7 |
| 9 | do | 0.1 | do | 95 | Ethyl | 3   2 | do | do | 4.7 |
| 10 | do | 0.05 | do | 95 | Methyl | 3   2 | do | do | 8.5 |
| 11 | do | 0.1 | Acrolein | 95 | do | 3   2 | do | do | 2.9 |
| 12 | N,N-dimethylhydroxylamine | 0.1 | Methacrolein | 95 | do | 3   2 | do | do | 3.6 |
| 13 | N,N-diisopropylhydroxylamine | 0.1 | do | 95 | do | 3   2 | do | do | 3.5 |
| 14 | N,N-di-n-butylhydroxylamine | 0.1 | do | 95 | do | 3   2 | do | do | 4.0 |
| 15 | N,N-diethylhydroxylamine hydrochloride | 0.1 | do | 80 | do | 15   5 | do | do | 5.5 |
| 16 | N,N-diethylhydroxylamine sulfate | 0.1 | do | 80 | do | 15   5 | do | do | 6.0 |
| 17 | N,N-diethylhydroxylamine acetate | 0.1 | do | 80 | do | 15   5 | do | do | 6.5 |
| 18 | {N,N-diethylhydroxylamine, p-t-Butyl catechol} | 0.8 | do | 80 | do | 20   0 | do | do | 1.5 |

TABLE II

| Control | Inhibitor | Weight percent based on the monomer | Sample solution (composition, weight percent based on total composition) | | | | | State of solution | Condition of dropping into n-hexane | Monomer decrease |
|---|---|---|---|---|---|---|---|---|---|---|
| | | | Monomer | Percent | Alcohol or organic solvent | Percent | Water, percent | | | |
| 1 | N,N-diethylhydroxylamine | 0.1 | Methacrolein | 100 | | 0 | 0 | Turbid | Large amount of precipitation | 35 |
| 2 | do | 0.1 | Acrolein | 100 | | 0 | 0 | Solidified | — | — |
| 3 | N,N-diisopropylhydroxylamine | 0.1 | Methacrolein | 100 | | 0 | 0 | Polymer formed | — | 28.9 |
| 4 | Hydroquinone | 0.1 | do | 80 | Methyl alcohol | 20 | 0 | Solidified | — | — |
| 5 | Sodium salt of N,N-dimethyldithiocarbamic acid | 0.1 | do | 95 | do | 3 | 2 | do | — | — |
| 6 | Copper acetate | 0.1 | do | 95 | do | 3 | 2 | do | — | — |
| 7 | Hydroquinone | 0.1 | do | 95 | do | 3 | 2 | do | — | — |
| 8 | p-t-Butyl catechol | 0.1 | do | 95 | do | 3 | 2 | Turbid | Polymer separation | 36.3 |
| 9 | Phenothiazine | 0.1 | do | 95 | do | 3 | 2 | do | do | 36.5 |
| 10 | p-t-Butyl catechol | 0.1 | do | 95 | Butyl alcohols | 3 | 2 | do | do | 24.3 |
| 11 | N,N-diethylhydroxylamine | 0.1 | do | 95 | Benzene | 3 | 2 | Transparent | do | 21.9 |
| 12 | N,N-diisopropylhydroxylamine | 0.1 | do | 95 | do | 3 | 2 | do | Large amount of precipitation | 30.3 |
| 13 | do | 0.1 | do | 80 | do | 20 | 0 | do | Polymer separation | 34.7 |
| 14 | N,N-diethylhydroxylamine | 0.1 | do | 80 | do | 20 | 0 | Turbid | Large amount of precipitation | 40.1 |
| 15 | do | 0.1 | do | 80 | n-Hexane | 20 | 0 | Polymer formed | do | 38.3 |
| 16 | do | 0.1 | do | 80 | Acetone | 20 | 0 | Transformed | do | 35.8 |
| 17 | do | 0.1 | do | 80 | Chloroform | 20 | 0 | Turbid | do | 42.1 |
| 18 | do | 0.1 | do | 80 | Acetic acid | 20 | 0 | Polymer formed | do | 32.5 |
| 19 | do | 0.1 | do | 80 | Acetophenone | 20 | 0 | Transparent | do | 29.5 |
| 20 | do | 0.1 | do | 80 | Ethyl ether | 20 | 0 | do | do | 35.7 |

What is claimed is:

1. A stabilized solution consisting essentially of an alkanol solution of an aldehyde monomer selected from the group consisting of acrolein and methacrolein, said alkanol having 1 to 8 carbon atoms and from 0.001 to 1% by weight, based on the weight of said monomer, of a hydroxylamine compound selected from the group consisting of N-alkylhydroxylamine having from 1 to 8 carbon atoms in the alkyl group, N,N-dialkylhydroxylamine having from 1 to 8 carbon atoms in each alkyl group and N,N-dicyclohexylhydroxylamine.

2. The solution of Claim 1, wherein said solution is exposed to a temperature between 80° C. and 150° C.

3. The solution of Claim 1, wherein said hydroxylamine is present in said solution in the form of a hydrate or salt thereof, said salt being the salt of an acid selected from the group consisting of hydrochloric, sulfuric, nitric, oxalic, malonic, citric, and saturated aliphatic acids selected from the group consisting of formic acid, acetic acid, propionic acid and butyric acid.

4. The solution of Claim 1, wherein said hydroxylamine is a N,N-dialkylhydroxylamine having from 1 to 6 carbon atoms in each alkyl group.

5. The solution of Claim 1, wherein the weight ratio of said monomer to said alcohol varies from 0.01:1 to 30:1.

6. A stabilized solution consisting essentially of an alkanol solution of an aldehyde monomer selected from the group consisting of acrolein and methacrolein, said alkanol having 1 to 8 carbon atoms, from 0.001 to 1% by weight, based on the weight of said monomer, of a hydroxylamine compound selected from the group consisting of N-alkylhydroxylamines having from 1 to 8 carbon atoms in the alkyl group, N,N-dialkylhydroxylamines having 1 to 8 carbon atoms in each alkyl group and N,N-dicyclohexylhydroxylamine, and an inhibiting amount of p-t-butyl catechol.

References Cited
UNITED STATES PATENTS

| 2,212,894 | 8/1940 | Allen | 260—67 |
| 3,408,422 | 10/1968 | May | 260—837 R |
| 2,939,882 | 6/1960 | Mecorney | 260—601 R |

OTHER REFERENCES

Schildknecht, C. E.: "Vinyl and Related Polymers," Wiley, 1951, pp. 699–701.

LEON ZITVER, Primary Examiner

D. B. SPRINGER, Assistant Examiner

U.S. Cl. X.R.

260—486 R